Aug. 19, 1924.
O. P. BIGELOW
1,505,532
VEHICLE LAMP MOUNTING
Filed Dec. 22, 1921
2 Sheets-Sheet 1
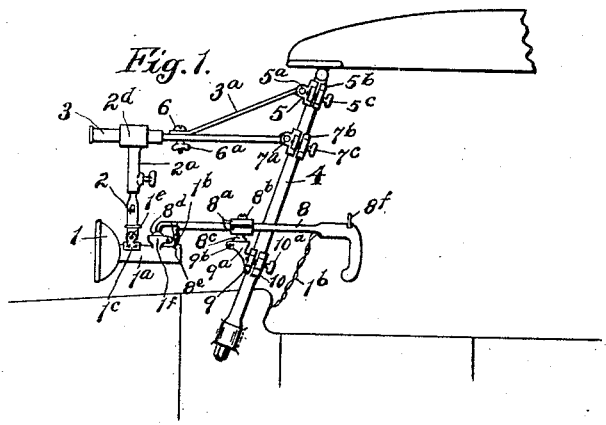
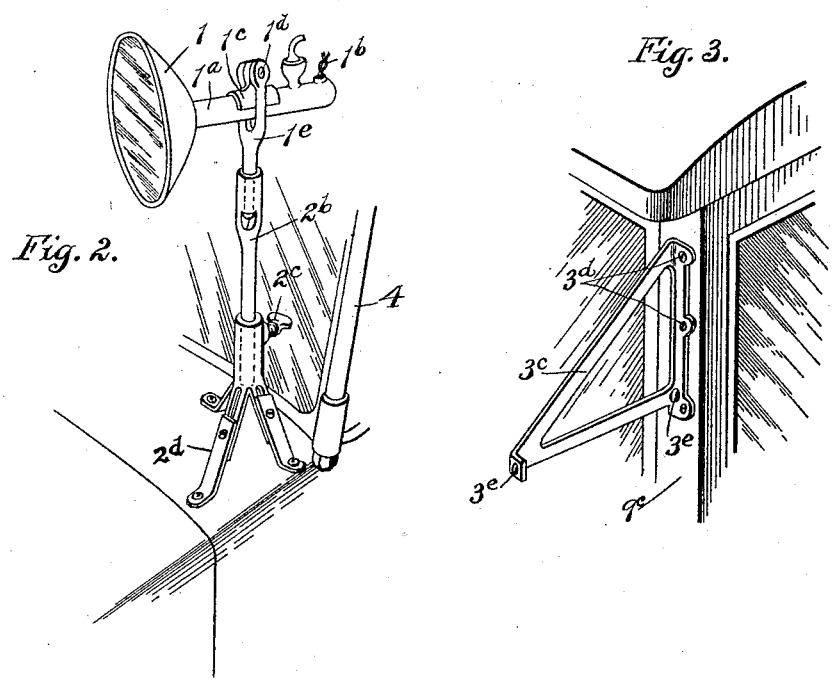
Inventor
Oliver P. Bigelow
By
Ted C. Billman
Attorney Aug. 19, 1924.
O. P. BIGELOW
1,505,532
VEHICLE LAMP MOUNTING
Filed Dec. 22, 1921   2 Sheets-Sheet 2
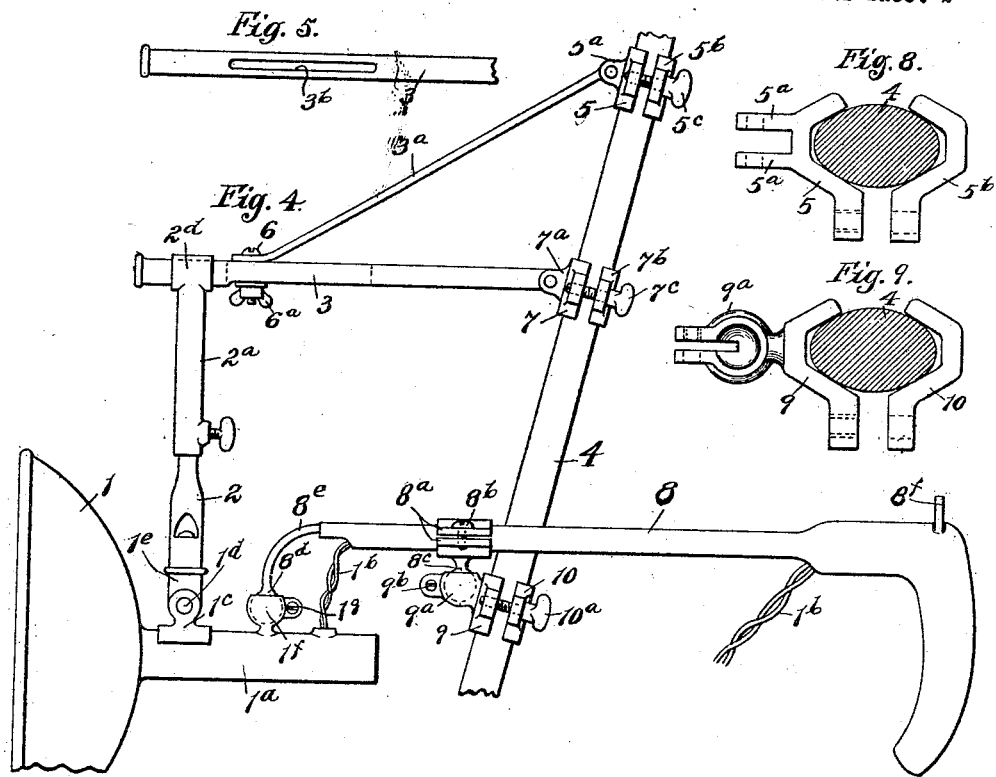
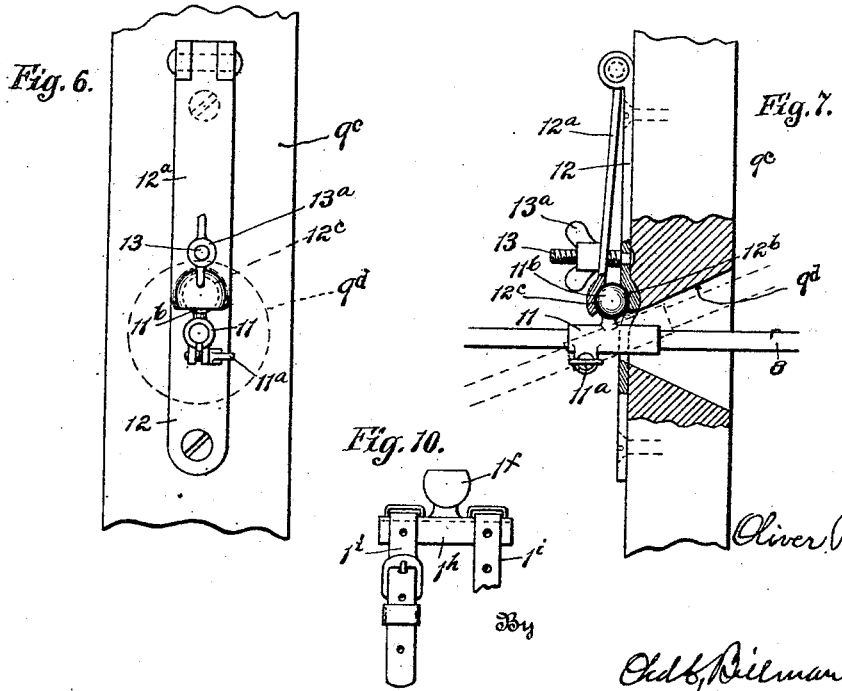
Inventor
Oliver P. Bigelow
By
Fred B. Billman  Attorney Patented Aug. 19, 1924.

1,505,532

UNITED STATES PATENT OFFICE.

OLIVER PERRY BIGELOW, OF CLEVELAND, OHIO.

VEHICLE LAMP MOUNTING.

Application filed December 22, 1921. Serial No. 524,077.

*To all whom it may concern:*

Be it known that I, OLIVER PERRY BIGELOW, a citizen of the United States, residing at Cleveland, in the county of Cuyahoga and State of Ohio, have invented certain new and useful Improvements in Vehicle Lamp Mountings, of which the following is a specification.

My invention relates to improvements in vehicle lamp mountings, the invention being particularly designed and adapted for use in mounting operating and controlling automobile lamps of the search or spot light type.

The primary object of the invention is to provide a generally improved lamp mounting and operating device of the class indicated which is exceedingly simple in construction, cheap of manufacture, and efficient in use.

A still further and very important object of the invention is to provide improved lamp mounting and operating mechanism which may be readily attached to the front of an automobile for directing and controlling the rays of an ordinary search or spot lamp from the inside of a closed car or an ordinary car of the open type with the storm curtains in position.

A still further object is the provision of an improved swivelling mounting for the lamp which may be readily adjusted for attachment to the fronts of motor vehicles of varying forms and types, and an improved flexibly mounted lamp operating and controlling handle leading to the interior of the vehicle and provided with a switch enabling the chauffeur or driver of the vehicle to swing the lamp in varying horizontal and vertical planes whereby, for example,—the lamp may be directed horizontally through an arc of a circle of considerably more than one half a circle thereby enabling the operator to direct the light upon house numbers, street numbers, and the like, located at or even somewhat behind a right angle to the general direction in which the vehicle is being driven.

A still further and very important object is the provision of an improved independently mounted lamp operating and light controlling handle having a switch with electrical connections leading to the lamp whereby the latter may be operated in vertical and horizontal planes and in compound movements between such planes and the lights turned on or off within such vehicle thereby avoiding the necessity of opening a window of the closed car or taking off the storm curtain of a car of the open type for such purpose.

With the above mentioned and other ends in view, the invention consists in the novel construction, arrangement, and combination of parts hereinafter described, illustrated in some of its embodiments in the accompanying drawings and particularly pointed out in the appended claims.

Referring to the drawings forming a part of this specification, Figure 1 is a side elevation of a lamp mounting and operating device, constructed in accordance with this invention, applied to an ordinary spot lamp and the windshield support or column of an automobile of the open type, the side or storm curtains being removed for the purpose of clearer illustration of the parts.

Fig. 2, a perspective view of an adjustable support and mounting of a modified form attached to a stationary portion of the vehicle in front of the windshield.

Fig. 3, a perspective view of a modified form of support in the specific form of a bracket as applied to the front portion of a car of the closed type.

Fig. 4, an enlarged side elevation of the swivelling lamp mounting and operating handle as applied to the side windshield support or column.

Fig. 5, a fragmentary top plan view of the main or slotted member of the bracket support shown in Fig. 4.

Fig. 6, a front elevation of a modified form of pivot or swivel mounting for the lamp operating handle, particularly designed and adapted for use in connection with one of the front pillars or columns of a car of the closed type.

Fig. 7, a side elevation of the same, a portion of the pillar or column being broken away for the purpose of clearer illustration of the part.

Fig. 8, an enlarged plan view of one of the adjustable clamps for securing the adjustable supporting bracket members to one of the columns of the windshield support, the supporting column being shown in section.

Fig. 9, a similar view of the swivelling ball socket bearing and clamp for connecting the lamp operating and controlling handle to the windshield supporting column.

Fig. 10, a view of a modified form of coupling member adapted to be strapped to an ordinary spot light.

Similar numerals of reference designate like parts throughout all the figures of the drawings.

The improved lamp mounting and operating device is adapted to be used in connection with a motor vehicle of the open type, as shown in Figs. 1, 2 and 4 of the drawings, or may be readily used in connection with a motor vehicle or automobile of the closed type, as shown in Fig. 3 of the drawings.

The spot lamp 1, may be of any suitable and convenient form but, in the present instance, I have shown such lamp with an elongated central socket stem or handle $1^a$, adapted to receive and contain suitable electric conductors or cords $1^b$, and provided with a suitable attaching swivel or coupling member $1^c$. The attaching member or bracket $1^c$, is provided with a cross bearing member or pin $1^d$, extending through a second coupling member $1^e$. The coupling member $1^e$ is swivelled within a second swivel member 2, the latter, in the present instance, being in the specific form of a supporting stem, said swivel stem 2, in the present instance, being adjustable in a sleeve head or stem $2^a$. The stem or sleeve $2^a$ may be either used as a pendant member, as shown in Figs. 1 and 4 of the drawings, or as a supporting column or pedestal $2^b$, as shown in Fig. 2 of the drawings. In either instance the swivel stem 2 may be adjusted longitudinally in the sleeve stem $2^a$ by means of a clamping screw $2^c$. When used as a pendant or suspended device the supporting stem $2^a$ is provided with a head $2^d$, loosely mounted on a support 3, the latter, in the present instance, being in the specific form of a bracket bar 3. As a means of attaching the support 3 in a horizontal position and adapting it to a windshield column or standard 4, extending in an inclined direction as shown, and particularly as a means of adjusting such support or bracket to windshield columns or standards of varying inclination the main bracket member 3 is provided with a second bracket or arm $3^a$, extending upwardly as a brace member, the end of the arm $3^a$ being connected in bearing lugs $5^a$, of a clamp member 5, the latter being connected to a second or complementary clamp $5^b$, by means of a clamping screw $5^c$. The main supporting bar 3 is provided with a longitudinal slot $3^b$, (see Fig. 5) in which a clamping screw or bolt 6, extends connecting the outer end of the brace member $3^a$, and being adapted to adjustably connect the arm to any desired inclination of the member 4, by means of an adjusting wing nut $6^a$. The rear end of the supporting bar 3 is pivotally mounted in bearing lugs $7^a$, of a clamp 7, the latter being connected to a second or complementary clamp $7^b$, by means of a clamping screw $7^c$.

As a means of operating or swinging the lamp 1 upon its pivot or swivel connections and turning such lamp in any desired direction or angle from within the closed vehicle and also energizing and de-energizing the source of illumination therein from within such closed car or vehicle, a lamp operating and controlling handle 8, is provided, said handle 8 being adapted to be suitably connected to some fixed portion of the vehicle, as for example,—to the windshield member 4 through some suitable flexible coupling or connection, said connection, in the present instance, comprising clamp members $8^a$, connected by clamping screws $8^b$, one of said clamp members $8^a$ being provided with a head $8^c$, adapted to operate in a split socket member $9^a$, of a clamp 9, the split ends of the socket $9^a$, being adapted to be connected and adjusted by means of a cross clamping screw $9^b$, the clamp 9 being secured to a second or complementary clamp 10, by means of a clamping screw $10^a$.

As a means of flexibly connecting the outer end of the operating handle 8 to the central stem or handle portion $1^a$ of the lamp, the stem $1^a$ is provided with a split socket $1^f$, adjusted by means of a clamp screw $1^g$, whereby such split socket $1^f$ is adjusted on the ball or head $8^d$, on the stem member $8^e$. As a means of enabling the driver or chauffeur of the car to turn on or off the electric current so that the source of illumination may be controlled from the inner or free end of the handle within the vehicle, the conductor cords $1^b$, extend within the handle member and communicate with a switch $8^f$, such switch being of any suitable and convenient form and forming no part of the present invention need not be described in detail.

Should it be desired to attach the mounting and controlling device to a car of the closed type, as shown in Fig. 3 of the drawings, the upper bracket arm $3^a$ may take the form of a fixed bracket $3^c$, attached to one of the pillars $9^c$ at the front of the vehicle through the medium of suitable attaching elements or screws $3^d$, the bracket being provided with suitable bearing openings $3^e$, to receive a supporting bar $3^c$, such as shown in Figs. 5 and 4 of the drawings, and, in such instance, a clamp 11, in the form of a sleeve provided with a clamping screw $11^a$, and a ball head or bearing $11^b$, is utilized, said bearing head $11^b$ being removably mounted in a two part socket made up of a fixed plate 12, and a second hingedly connected plate $12^a$, is provided, the plates 12 and $12^a$ forming socket portions $12^b$ and 12ᶜ, and the bearing portions being adapted to be adjusted by means of a clamping screw 13 and wing nut 13ª. In such instance the pillar or column 9ᶜ is provided with a conical opening 9ᵈ to receive the handle 8 and permit free movement of the latter as indicated in Fig. 7 of the drawings.

In Fig. 10 I have shown the split socket 1ᶠ, incorporated in a separate clamp 1ʰ, for ready attachment to the stem or handle portion of an ordinary spot light through the medium of clamping straps 1ⁱ.

In Fig. 2 of the drawings I have shown the supporting stem or sleeve 2ª, in the specific form of a supporting column 2ᵇ, the latter being secured to a fixed portion of the vehicle by means of adjustable legs 2ᵈ.

Having thus described some of the embodiments of my invention, without having attempted to set forth all the forms in which it may be made, or all the modes of its use, what I claim and desire to secure by Letters Patent, is,—

1. In a lamp mounting, including a lamp having a supporting stem, a support, vertical and transverse swivel connections between the latter and said supporting stem of said lamp permitting a universal movement to be imparted to the latter, and an operating handle mounted for universal movement and flexibly connected to said lamp for imparting a universal movement to said lamp with a like movement of said operating handle.

2. In a lamp mounting, including a lamp, a support, swivelling stems between the latter and said lamp extending in the axial plane of the latter, and an operating handle mounted for universal movement flexibly connected to said lamp at one side of the axis of movement of the latter and said swivelling stems whereby said lamp may be swung vertically and longitudinally on its swivelling axes in varying directions.

3. In a mounting for lamps, a support, a swivelled supporting stem, a second swivelled stem movable relatively of the latter, a search lamp provided with a supporting stem, a flexible connection between the latter and said second swivelling stem, and an operating handle including a flexible coupling providing universal movement and flexibly connected to said lamp at one side of said flexible connection between said second swivelling stem and said lamp whereby the latter may be given a universal movement and be swung and held in varying planes to said handle.

4. In a lamp mounting, including a closed vehicle, an exterior support, a supporting stem carried by said support, a second stem having a swivel connection with said supporting stem, a lamp, a transverse swivel connection between the latter and said second stem, the lines of the axes of said swivel connections intersecting, and an operating handle flexibly connected to said lamp and said vehicle and extending within the latter whereby said lamp may be given a movement in any desired direction from within said closed vehicle.

5. In a mounting for lamps, a support, a supporting stem swivelled thereon, a second stem swivelly connected to said supporting stem, a lamp provided with a socket stem portion, a swivelling connection between the latter and said second swivelling stem, and an operating handle mounted for universal movement and flexibly connected to said lamp whereby the latter may be operated in varying vertical and horizontal directions to thereby control the projection of light from within the vehicle.

6. In a mounting for lamps, a support, a supporting stem swivelled thereon, a second stem swivelly connected to and extending in alinement with said first stem, a lamp provided with a central handle, a transverse swivel connection between the latter and said second swivelling stem, and an operating handle having a flexible supporting coupling providing universal movement for said handle, said handle being also flexibly connected to said lamp whereby the latter may be given movement in any desired direction to thereby control the projection of light.

7. In a mounting for lamps, an adjustable support, a supporting stem swivelled in the latter, a second stem swivelly connected to said supporting stem, a spot lamp provided with a socket stem portion, a swivelling connection between the latter and said second swivelling stem, and an independently mounted handle leading to said lamp whereby the latter may be operated in vertical and horizontal directions and the light controlled from within the vehicle.

In testimony whereof I have affixed my signature.

OLIVER PERRY BIGELOW.